(12) United States Patent
Murakami et al.

(10) Patent No.: US 7,290,636 B2
(45) Date of Patent: Nov. 6, 2007

(54) DEVICE AND METHOD FOR CONTROLLING DISTRIBUTION OF DRIVE FORCE OF FOUR-WHEEL DRIVE CAR

(75) Inventors: Tsuyoshi Murakami, Handa (JP); Ryohei Shigeta, Hiroshima (JP)

(73) Assignee: Jtekt Corporation, Osaka (JP)

( * ) Notice: Subject to any disclaimer, the term of this patent is extended or adjusted under 35 U.S.C. 154(b) by 144 days.

(21) Appl. No.: 10/487,006

(22) PCT Filed: Apr. 25, 2003

(86) PCT No.: PCT/JP03/05402

§ 371 (c)(1),
(2), (4) Date: Feb. 19, 2004

(87) PCT Pub. No.: WO03/091057

PCT Pub. Date: Nov. 6, 2003

(65) Prior Publication Data

US 2004/0200656 A1   Oct. 14, 2004

(30) Foreign Application Priority Data

Apr. 26, 2002  (JP) .............................. 2002-126223

(51) Int. Cl.
*B60K 17/34* (2006.01)
(52) U.S. Cl. ........................................ 180/433; 701/69
(58) Field of Classification Search ................ 180/233, 180/247, 248; 701/69
See application file for complete search history.

(56) References Cited

U.S. PATENT DOCUMENTS

| | | | |
|---|---|---|---|
| 4,699,236 A | | 10/1987 | Morisawa et al. |
| 4,766,973 A | | 8/1988 | Kashihara et al. |
| 4,866,625 A | | 9/1989 | Kawamoto et al. |
| 5,184,695 A | * | 2/1993 | Matsuda et al. ............ 180/233 |
| 5,226,502 A | | 7/1993 | Kameda |
| 5,346,032 A | * | 9/1994 | Sasaki ........................ 180/233 |
| 5,737,714 A | | 4/1998 | Matsuno et al. |
| 5,954,778 A | * | 9/1999 | Rodrigues et al. ............ 701/69 |

FOREIGN PATENT DOCUMENTS

| | | |
|---|---|---|
| DE | 196 41 101 | 4/1998 |
| EP | 0 438 176 | 7/1991 |

(Continued)

OTHER PUBLICATIONS

U.S. Appl. No. 10/487,006, filed Feb. 19, 2004, Murakami et al.

(Continued)

*Primary Examiner*—Anne Marie Boehler
(74) *Attorney, Agent, or Firm*—Oblon, Spivak, McClelland, Maier & Neustadt, P.C.

(57) ABSTRACT

A driving force distribution control apparatus and driving force distribution control method for a four-wheel drive vehicle which can quickly increase torque distribution to sub-drive wheels after a transmission has been shifted down. According to the apparatus and method, when it is determined that the transmission has been shifted down, an ECU controls a coupling capable of changing the torque distribution to the front wheels and rear wheels such that the torque distribution to the front wheels and rear wheels approaches a uniform state.

10 Claims, 3 Drawing Sheets

FOREIGN PATENT DOCUMENTS

| | | |
|---|---|---|
| JP | 58-180325 | 10/1983 |
| JP | 62-91323 | 4/1987 |
| JP | 63-20227 | 1/1988 |
| JP | 2-102824 | 4/1990 |
| JP | 3-231033 | 10/1991 |
| JP | 4-212630 | 8/1992 |
| JP | 5-319127 | 12/1993 |
| JP | 6-107019 | 4/1994 |
| JP | 6-288415 | 10/1994 |
| JP | 9-263150 | 10/1997 |

OTHER PUBLICATIONS

U.S. Appl. No. 10/486,928, filed Feb. 25, 2004, Shigeta et al.

* cited by examiner

DEVICE AND METHOD FOR CONTROLLING DISTRIBUTION OF DRIVE FORCE OF FOUR-WHEEL DRIVE CAR

CROSS-REFERENCE TO RELATED APPLICATIONS

This application is based upon and claims the benefit of priority from prior Japanese Patent Application No. 2002-126223, filed on Apr. 26, 2003, the entire contents of which are incorporated herein by reference.

FIELD OF THE INVENTION

The present invention relates to a driving force distribution control apparatus and driving force distribution control method for a four-wheel drive vehicle.

BACKGROUND OF THE INVENTION

A part-time driving system which selectively switches between a four-wheel drive (4WD) mode and a two-wheel drive (2WD) mode and a full-time driving system which always drives four wheels are known as four-wheel driving systems for vehicles. In the part-time driving system, mode switching is according to manual operation by a driver. The full-time driving system has a center differential between the front wheels and rear wheels. The center differential permits the differential of the front wheels and the rear wheels to always drive the four wheels.

A standby driving system is known too as a four-wheel driving system other than the part-time driving system and full-time driving system. In this standby driving system, the main drive wheels of a vehicle are coupled to the engine without the intervention of the coupling and the sub-drive wheels are coupled to the engine via the coupling. The coupling force (engaging force) of the coupling is changed in accordance with the road conditions and driving state, thereby changing the torque distribution ratio $D_{SUB/MAIN}$, which is the ratio of the torque to be transmitted to the sub-drive wheels from the engine to the torque to be transmitted to the main drive wheels from the engine.

In the standby driving system, a controller compares a wheel speed difference $\Delta N$, which is the difference between the rotational speed of the main drive wheels and the rotational speed of the sub-drive wheels, with a predetermined threshold value. When the wheel speed difference $\Delta N$ exceeds the threshold value, the controller predicts that acceleration takes place and controls the coupling in such a way that the torque distribution ratio $D_{SUB/MAIN}$ increases, i.e., the torque distribution of the sub-drive wheels increases.

Even if the transmission is shifted down to accelerate the vehicle in the standby driving system, however, the controller cannot detect that acceleration is taking place until the wheel speed difference $\Delta N$ exceeds the threshold value. Therefore, there is a delay from the point at which shift-down has been performed to the point at which the increase in torque distribution ratio $D_{SUB/MAIN}$ starts.

Japanese Laid-Open Patent Publication No. 6-288415 discloses a mechanical coupling as the coupling that is used in a four-wheel driving system. Even if the mechanical coupling is adapted to a standby driving system, however, the beginning of the increase in torque distribution ratio $D_{SUB/MAIN}$ cannot be interlocked with the shift-down.

SUMMARY OF THE INVENTION

It is therefore an object of the present invention to provide a driving force distribution control apparatus and a driving force distribution control method which can promptly increase torque distribution to sub-drive wheels after the transmission is shifted down.

To achieve the object, the present invention provides the following driving force distribution control apparatus for a four-wheel drive vehicle. The four-wheel drive vehicle has an engine, front wheels and rear wheels to be driven by torque generated by the engine, a coupling capable of changing torque distribution to the front wheels and rear wheels, and a transmission. The driving force distribution control apparatus has a controller which controls the coupling in such a way that the torque distribution to the front wheels and rear wheels approaches a uniform state when having determined that the transmission is shifted down.

The present invention also provides a driving force distribution control method for a four-wheel drive vehicle. The four-wheel drive vehicle has an engine, front wheels and rear wheels to be driven by torque generated by the engine, a coupling capable of changing torque distribution to the front wheels and rear wheels, and a transmission. The driving force distribution control method has a step of determining whether or not the transmission is shifted down; and a step of controlling the coupling in such a way that the torque distribution to the front wheels and rear wheels approaches a uniform state when it is determined that the transmission is shifted down.

DETAILED DESCRIPTION OF THE PREFERRED EMBODIMENTS

One embodiment of the invention will be described below referring to FIGS. 1 to 4.

Figure 1:
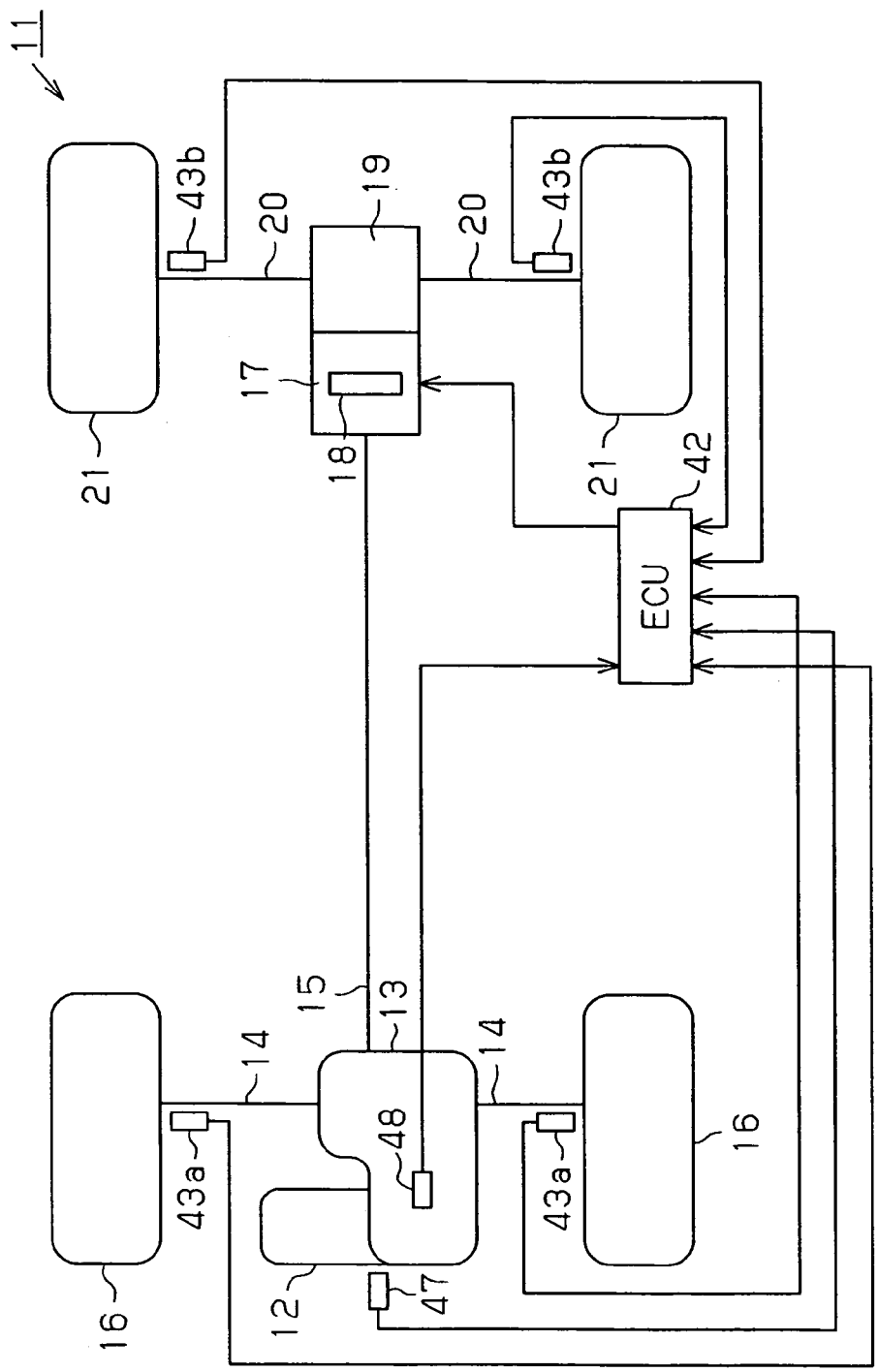
FIG. 1 is a schematic structural diagram illustrating a four-wheel drive vehicle according to one embodiment of the invention.

A vehicle (four-wheel drive vehicle) 11 shown in FIG. 1 has an engine 12 as an internal combustion engine and a transaxle 13. The transaxle 13 has a manual transmission and a transfer (both not shown). The manual transmission includes gears which are switched by the operation of an unillustrated shift lever. The transaxle 13 is coupled to a pair of front axles 14 and a propeller shaft 15. Each front axle 14 is coupled to a front wheel 16.

The propeller shaft 15 is coupled in a disconnectable manner to a drive pinion shaft (not shown) via a driving force transmitting apparatus, which is a coupling 17. The drive pinion shaft is coupled to a rear differential 19. The rear differential 19 is coupled to a pair of rear axles 20. Each rear axle 20 is coupled to a rear wheel 21.

The front wheels 16 function as main drive wheels to be coupled to the engine 12 without the intervention of the coupling 17. The rear wheels 21 function as sub-drive wheels to be coupled to the engine 12 via the coupling 17.

The torque (driving force) generated by the engine 12 is transmitted to the front wheels 16 via the transaxle 13 and front axles 14. When the propeller shaft 15 and the drive pinion shaft are coupled together via the coupling 17, the torque of the engine 12 is also transmitted to the rear wheels 21 via the propeller shaft 15, the drive pinion shaft, the rear differential 19 and the rear axles 20.

The coupling 17 has an electromagnetic clutch mechanism 18 of a wet multiplate type. The electromagnetic clutch mechanism 18 has a plurality of clutch plates (not shown), which are frictionally engaged with or disengaged from one another, and an electromagnetic coil (not shown). As the current is supplied to the electromagnetic coil, the clutch plates are frictionally engaged with one another with force according to the amount of the supplied current, resulting in that the electromagnetic clutch mechanism 18 can transmit the torque of the engine 12 to the rear wheels 21. When the current is not supplied to the electromagnetic coil, the clutch plates are disengaged from one another, so that the electromagnetic clutch mechanism 18 cannot transmit the torque of the engine 12 to the rear wheels 21.

The vehicle 11 has an ECU 42 which serves as a controller. The ECU 42 controls the amount of the current supplied to the electromagnetic coil. The amount of the torque to be transmitted to the rear wheels 21 from the engine 12 varies according to the magnitude of the engaging force of the clutch plates of the electromagnetic clutch mechanism 18. The magnitude of the engaging force of the clutch plates changes according to the amount of the current that is supplied to the electromagnetic coil of the electromagnetic clutch mechanism 18.

The ECU 42 selectively switches between a four-wheel drive mode in which the torque of the engine 12 is transmitted to both the front wheels 16 and rear wheels 21, and a two-wheel drive mode in which the torque of the engine 12 is transmitted only to the front wheels 16 but not to the rear wheels 21. In four-wheel drive mode, the ECU 42 controls the coupling 17 in such a way as to change the ratio of the torque to be transmitted to the front wheels 16 from the engine 12 and the torque to be transmitted to the rear wheels 21 from the engine 12. In other words, the ECU 42 controls the coupling 17 in such a way as to change a torque distribution ratio $D_{SUB/MAIN}$, which is the ratio of the torque to be transmitted to the rear wheels 21 from the engine 12 to the torque to be transmitted to the front wheels 16 from the engine 12.

When the amount of the current to be supplied to the electromagnetic coil is zero, the transmission of the torque of the electromagnetic clutch mechanism 18 is inhibited, resulting in that the torque distribution ratio $D_{SUB/MAIN}$ becomes 0/100. When the electromagnetic clutch mechanism 18 is coupled completely, i.e., when the engaging force of the clutch plates is maximum, the torque distribution ratio $D_{SUB/MAIN}$ becomes 50/50 unless none of the four wheels are slipping. In accordance with a control instruction from the ECU 42, the torque distribution ratio $D_{SUB/MAIN}$ is changed to within the range of 0/100 to 50/50.

The ECU 42 mainly comprises a microcomputer having a CPU, RAM, ROM and I/O interface. Stored in the ROM are, for example, various control programs the ECU 42 executes, and various data and maps. The maps have been acquired beforehand by, for example, experimental data based on vehicle models and well-known theoretical computations or the like. The RAM is a data work area for the CPU to load a control program written in the ROM and execute various arithmetic operations.

Figure 2A:
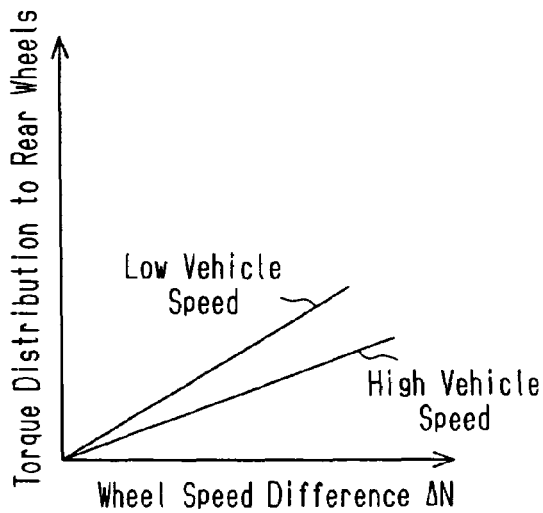
FIGS. 2A and 2B are graphs showing maps to be used in normal mode.
Figure 2B:
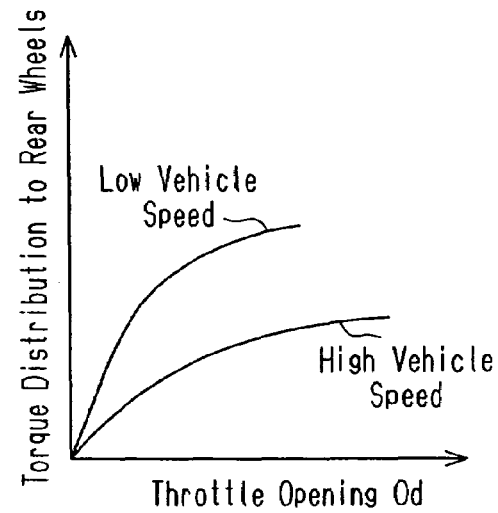
Figure 3A:
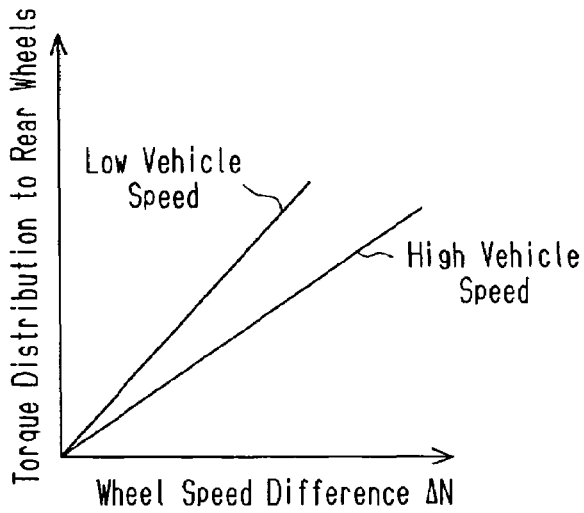
FIGS. 3A and 3B are graphs showing maps to be used in acceleration mode.
Figure 3B:
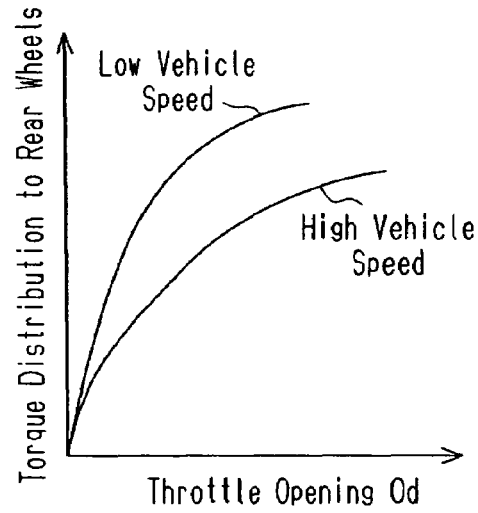

FIGS. 2A to 3B show the maps stored in the ROM as graphs. The maps shown in FIGS. 2A and 2B are used when the vehicle 11 is not accelerated, i.e., at the time the torque distribution ratio $D_{SUB/MAIN}$ is determined to be in normal mode. The torque distribution ratio $D_{SUB/MAIN}$ is determined to be in normal mode by adding a first calculation value, which is computed using the map shown in FIG. 2A, and a second calculation value, which is computed using the map shown in FIG. 2B, by a predetermined ratio. The maps shown in FIGS. 3A and 3B are used when the vehicle 11 is accelerated, i.e., at the time the torque distribution ratio $D_{SUB/MAIN}$ is determined to be in acceleration mode. The torque distribution ratio $D_{SUB/MAIN}$ is determined to be in acceleration mode by adding a third calculation value, which is computed using the map shown in FIG. 3A, and a fourth calculation value, which is computed using the map shown in FIG. 3B, by a predetermined ratio. Each of the first to fourth calculation values represents the magnitude of the torque distribution to the rear wheels 21.

The first calculation value is computed from a vehicle speed V and a wheel speed difference ΔN based on the map shown in FIG. 2A. The wheel speed difference ΔN is the difference between the average of the rotational speed of the left and right front wheels 16 and the rotational speed of the left and right rear wheels 21. When the vehicle speed V is constant, the first calculation value linearly increases as the wheel speed difference ΔN becomes larger. When the wheel speed difference ΔN is constant, the first calculation value becomes smaller as the vehicle speed V becomes greater.

The second calculation value is computed from the vehicle speed V and throttle opening Od based on the map shown in FIG. 2B. The throttle opening Od is the opening of a throttle valve (not shown) provided in the engine 12. When the vehicle speed V is constant, the second calculation value increases as the throttle opening Od becomes larger. The amount of increase in the second calculation value originated from an increase in throttle opening Od becomes smaller as the throttle opening Od becomes greater. When the throttle opening Od is constant, the second calculation value becomes larger as the vehicle speed V becomes lower.

The third calculation value is computed from the vehicle speed V and the wheel speed difference ΔN based on the map shown in FIG. 3A. Under the conditions of the same vehicle speed V and wheel speed difference ΔN, the third calculation value acquired based on the map shown in FIG. 3A is greater than the first calculation value acquired based on the map shown in FIG. 2A. When the vehicle speed V is constant, the third calculation value linearly increases as the wheel speed difference ΔN becomes larger. When the wheel speed difference ΔN is constant, the third calculation value becomes smaller as the vehicle speed V becomes larger.

The fourth calculation value is computed from the vehicle speed V and the throttle opening Od based on the map shown in FIG. 3B. Under the conditions of the same vehicle speed V and throttle opening Od, the fourth calculation value acquired based on the map shown in FIG. 3B is greater than the second calculation value acquired based on the map shown in FIG. 2B. When the vehicle speed V is constant, the fourth calculation value increases as the throttle opening Od becomes larger. The amount of increase in the fourth calculation value originated from an increase in throttle opening Od becomes smaller as the throttle opening Od becomes greater. When the throttle opening Od is constant, the fourth calculation value becomes larger as the vehicle speed V becomes lower.

As shown in FIG. 1, the ECU 42 is connected to two front-wheel speed sensors 43a, two rear-wheel speed sensors 43*b*, a throttle opening sensor 47 as a throttle opening detection device, and a gear position sensor 48 as a gear position detection device. The ECU 42 receives inputs (detection signals) from the front-wheel speed sensors 43*a*, 43*b*, the throttle opening sensor 47 and the gear position sensor 48 via the I/O interface. The ECU 42 sends an output to the coupling 17 and an engine control apparatus (not shown) via the I/O interface.

The front-wheel speed sensor 43*a* is provided on each of the front wheels 16 and detects the rotational speed of the corresponding front wheel 16. The rear-wheel speed sensor 43*b* is provided on each of the rear wheels 21 and detects the rotational speed of the corresponding rear wheel 21. The throttle opening sensor 47, connected to the throttle valve, detects the throttle opening Od. The throttle opening Od reflects the depression amount of the accelerator pedal (not shown) of the vehicle 11. The gear position sensor 48 detects the gear position of the manual transmission.

Figure 4:
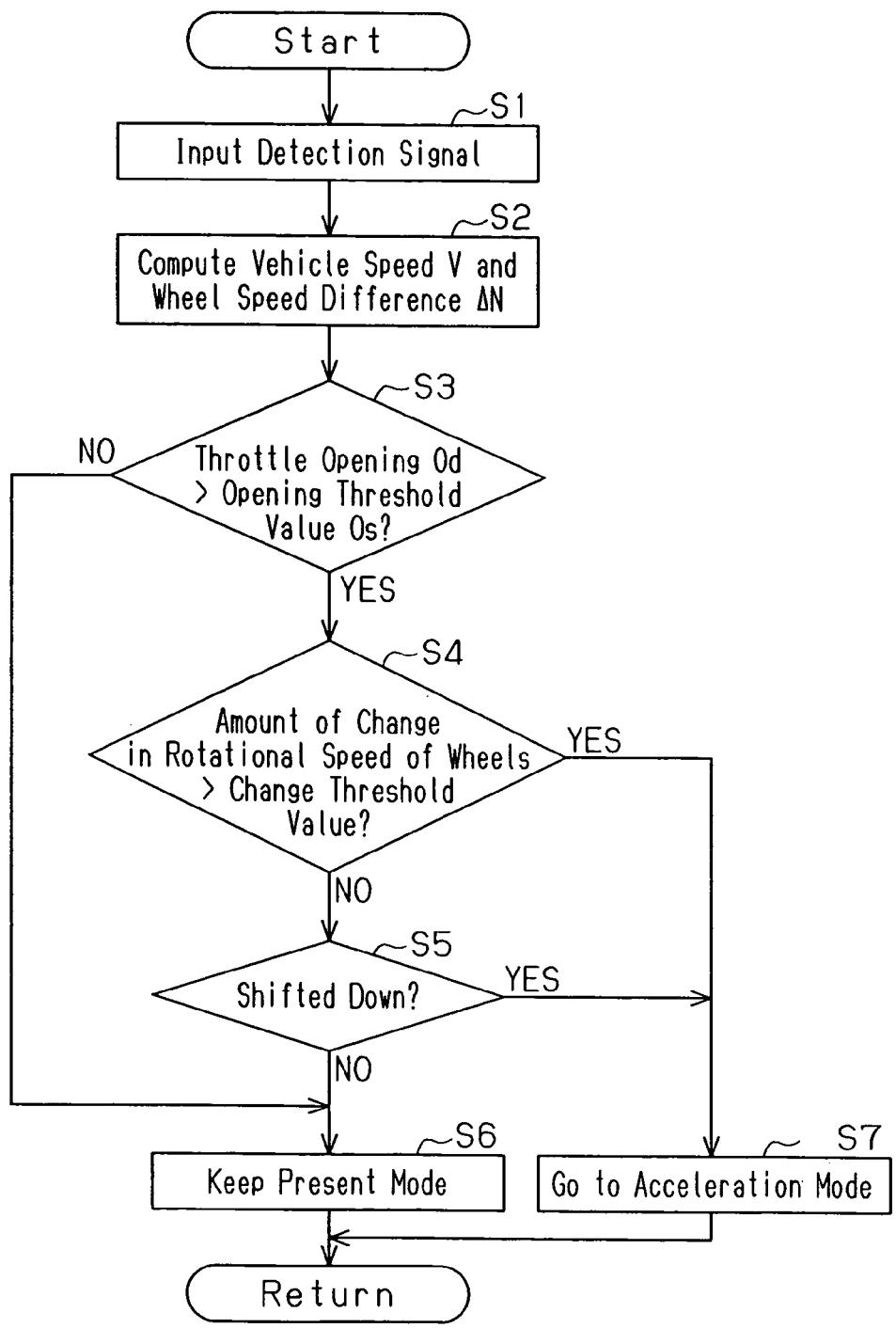
FIG. 4 is a flowchart illustrating procedures of control, that are executed by an ECU equipped in the four-wheel drive vehicle in FIG. 1.

FIG. 4 is a flowchart illustrating procedures of control, which are executed by the ECU 42. The routine shown in the flowchart of FIG. 4 is executed in a predetermined cycle.

In step S1, the ECU 42 receives detection signals from the front-wheel speed sensors 43*a*, 43*b*, the throttle opening sensor 47 and the gear position sensor 48.

In step S2, the ECU 42 computes the vehicle speed V and wheel speed difference ΔN based on the detection signals input in step S1. The vehicle speed V is computed from the average of the rotational speeds of the left and right rear wheels 21.

In step S3, the ECU 42 determines whether or not the throttle opening Od is greater than a predetermined opening threshold value Os. When it is determined that the throttle opening Od is equal to or less than the opening threshold value Os, the ECU 42 proceeds to step S6, and when it is determined that the throttle opening Od is larger than the opening threshold value Os, the ECU 42 proceeds to step S4. The opening threshold value Os is stored in the ROM beforehand as a function of the vehicle speed V. The opening threshold value Os is a relatively small value and is a value equivalent to the throttle opening at the time of engine braking, in other words, a value equivalent to the throttle opening when the depression amount of the accelerator pedal is zero or nearly zero.

In step S4, the ECU 42 determines whether or not the amount of change in the rotational speed of each of the wheels 16, 21 in a predetermined time (e.g., several hundred ms) is greater than a predetermined change threshold value. When it is determined that the amount of change in the rotational speed of every wheel 16, 21 is equal to or smaller than the change threshold value, the ECU 42 goes to step S5, and when it is determined that the amount of change in the rotational speed of at least one wheel 16, 21 is greater than the change threshold value, the ECU 42 goes to step S7. The change threshold value is stored in the ROM beforehand.

In step S5, the ECU 42 determines whether or not the transmission has been shifted down. In other words, the ECU 42 determines whether or not the gear position detected in the present routine is a lower-gear position, as compared with the gear position detected in the previous routine. The ECU 42 goes to step S6 when it is determined that the transmission has not been shifted down, and goes to step S7 when it is determined that the transmission has been shifted down.

In step S6, the ECU 42 sets a flag showing the normal mode when the current mode is the normal mode and sets a flag showing the acceleration mode when the current mode is the acceleration mode. The ECU 42 selects maps to be used according to the set flag and determines the torque distribution ratio $D_{SUB/MAIN}$ based on the selected maps.

In normal mode, the ECU 42 determines the torque distribution ratio $D_{SUB/MAIN}$ based on the maps shown in FIGS. 2A and 2B. In acceleration mode, the ECU 42 determines the torque distribution ratio $D_{SUB/MAIN}$ based on the maps shown in FIGS. 3A and 3B. In accordance with the determined torque distribution ratio $D_{SUB/MAIN}$, the ECU 42 determines the amount of the current to be supplied to the electromagnetic coil of the electromagnetic clutch mechanism 18.

In step S7, the ECU 42 sets the flag showing the acceleration mode. And, the ECU 42 determines the torque distribution ratio $D_{SUB/MAIN}$ based on the maps shown in FIGS. 3A and 3B, and determines the amount of the current to be supplied to the electromagnetic coil in accordance with the determined torque distribution ratio $D_{SUB/MAIN}$.

The flags that have been set in step S6 and step S7 are cleared when it is determined that the throttle opening Od is equal to or less than the opening threshold value Os in step S3 in the next routine or any one following it.

When it is determined that the throttle opening Od is greater than the opening threshold value Os, even if it is determined that the amount of change in the rotational speed of every wheel 16, 21 is equal to or smaller than the change threshold value, the ECU 42 enters the acceleration mode as long as it is determined that the transmission has been shifted down. In acceleration mode, the ECU 42 controls the coupling 17 in such a way that the torque distribution to the front wheels 16 and rear wheels 21 approaches a uniform state.

Conventionally, in the case where the ECU 42 goes to the acceleration mode, the depression of the accelerator pedal by the driver changes the rotational speed of the wheels, after which the frictional coupling force of the coupling 17 is changed for the first time when the wheel speed difference ΔN exceeds the threshold value. Even if the driver depresses the accelerator pedal, therefore, the strong torque feeling originated from an increase in torque distribution to the rear wheels 21 is not obtained soon.

According to the embodiment, by way of contrast, when the ECU 42 detects shift-down which is to be carried out to accelerate the vehicle 11, the ECU 42 determines the amount of the current to be supplied to the electromagnetic coil of the electromagnetic clutch mechanism 18 and supplies the determined amount of current to the electromagnetic coil. Therefore, after the transmission is shifted down, the torque distribution to the rear wheels 21 is increased quickly. During the period from the point when the driver has shifted down for acceleration to the point when the driver depresses the accelerator pedal, changing the frictional engaging force of the coupling 17 is completed. Thus, the driver depresses the accelerator pedal with the torque distribution to the rear wheels 21 increased. The driver can therefore acquire the strong torque feeling soon upon depression of the accelerator pedal.

The embodiment has the following advantages.

Prior to determination as to whether the transmission has been shifted down or not, the ECU 42 determines whether or not the throttle opening Od is greater than the opening threshold value Os. When it is determined that the throttle opening Od is greater than the opening threshold value Os and the transmission has been shifted down, the ECU 42 enters the acceleration mode and controls the coupling 17 in such a way that the torque distribution to the front wheels 16 and rear wheels 21 approaches a uniform state. Therefore, the ECU 42 is prevented from erroneously determining that a shift-down which was carried out to decelerate the vehicle 11, was a shift-down carried out to accelerate the vehicle 11. This improves the determination precision.

Prior to determination as to whether the transmission has been shifted down or not, the ECU 42 determines whether or not the amount of change in the rotational speed of each of the wheels 16, 21 is greater than a predetermined change threshold value. When it is determined that the amount of change in the rotational speed of at least one wheel 16, 21 is greater than the change threshold value, the ECU 42 enters the acceleration mode and controls the coupling 17 in such a way that the torque distribution to the front wheels 16 and rear wheels 21 approaches a uniform state. Even if it is determined that the amount of change in the rotational speed of every wheel 16, 21 is equal to or smaller than the change threshold value, the ECU 42 enters the acceleration mode when it is determined that the transmission has been shifted down.

The embodiment may be modified as follow.

The electromagnetic clutch mechanism 18 may be replaced with a clutch mechanism, such as a hydraulic clutch mechanism, other than the electronically controllable electromagnetic clutch mechanism 18.

The vehicle 11 may have a center differential (differential control unit). In other words, the present invention may be adapted to a full-time driving system, which always drives four wheels.

The vehicle 11 may be adapted to a four-wheel drive vehicle whose rear wheels 21 function as main drive wheels and whose front wheels 16 function as sub-drive wheels. In this case, the front wheels 16 are coupled to the engine 12 via the coupling 17 and the rear wheels 21 are coupled to the engine 12 without the intervention of the coupling 17.

In the embodiment, the vehicle speed V is calculated based on the average of the rotational speeds of the left and right rear wheels 21. However, a vehicle speed sensor (vehicle speed detection device) may be provided instead to directly detect the vehicle speed V.

The manual transmission may be replaced with an automatic transmission.

The torque distribution ratio $D_{SUB/MAIN}$ is not limited to 0/100 to 50/50 but may be change between 20/80 to 50/50.

The invention claimed is:

1. A driving force distribution control apparatus for a four-wheel drive vehicle which has an engine, front wheels and rear wheels to be driven by torque generated by said engine, a coupling capable of changing torque distribution to the front wheels and rear wheels, and a transmission, the driving force distribution control apparatus comprising:
   means for controlling torque distribution to the front wheels and rear wheels according to a first mode when the vehicle is not accelerating, and for controlling torque distribution to the front wheels and rear wheels according to a second mode when the vehicle is accelerating; and
   means for switching from said first mode to said second mode based on factors limited to consideration of a determination that the transmission has been shifted down and a determination that an amount of change in rotational speed of at least one of the front wheels and the rear wheels is greater than a predetermined threshold value, wherein the means for switching switches from said first mode to said second mode based on one of the determination that the transmission has been shifted down or the determination that an amount of change in rotational speed of at least one of the front wheels and the rear wheels is greater than a predetermined threshold value.

2. The driving force distribution control apparatus according to claim 1, further comprising an engine throttle opening detector, wherein said means for switching from said first mode to said second mode permits the switching from said first mode to said second mode only when a detected throttle opening is greater than a predetermined opening threshold value.

3. The driving force distribution control apparatus according to claim 2, wherein said opening threshold value is equivalent to a value of the throttle opening at the time of engine braking.

4. The driving force distribution control apparatus according to claim 1, wherein torque distribution to the front wheels and rear wheels according to the first and second modes is based on an engine throttle opening and a wheel speed difference between the front and rear wheels.

5. The driving force distribution control apparatus according to claim 1, wherein either said front wheels or said rear wheels are main drive wheels to be coupled to said engine without the intervention of said coupling and the others are sub-drive wheels to be coupled to said engine via said coupling.

6. The driving force distribution control apparatus according to claim 5, wherein said controller controls said coupling in such a way as to increase the torque distribution to said sub-drive wheels.

7. The driving force distribution control apparatus according to claim 1, further comprising a gear position detection device that detects a gear position of said transmission, wherein:
   said means for switching determines whether or not said transmission is shifted down based on a change in the detected gear position.

8. A driving force distribution control method for a four-wheel drive vehicle which has an engine, front wheels and rear wheels to be driven by torque generated by said engine, a coupling capable of changing torque distribution to the front wheels and rear wheels, and a transmission, the driving force distribution control method comprising the steps of:
   controlling torque distribution to the front wheels and rear wheels according to a first mode when the vehicle is not accelerating, and for controlling torque distribution to the front wheels and rear wheels according to a second mode when the vehicle is accelerating; and
   switching from said first mode to said second mode based on factors limited to consideration of a determination that the transmission has been shifted down and a determination that an amount of change in rotational speed of at least one of the front wheels and the rear wheels is greater than a predetermined threshold value, wherein the switching from said first mode to said second mode is based on one of the determination that the transmission has been shifted down or the determination that an amount of change in rotational speed of at least one of the front wheels and the rear wheels is greater than a predetermined threshold value.

9. The driving force distribution control method according to claim 8, further comprising a step of switching from said first mode to said second mode when a detected throttle opening is greater than a predetermined opening threshold value.

10. The driving force distribution control method according to claim 8, wherein torque distribution to the front wheels and rear wheels according to the first and second modes is based on an engine throttle opening and a wheel speed difference between the front and rear wheels.

* * * * *